(12) United States Patent
Perlman et al.

(10) Patent No.: US 11,247,101 B2
(45) Date of Patent: Feb. 15, 2022

(54) METHODS AND SYSTEMS FOR FACILITATING THE MEMORIZATION OF EXERCISE ROUTINES TO USERS

(71) Applicant: Zumba Fitness, LLC, Hallandale, FL (US)

(72) Inventors: Alberto Perlman, Hallandale, FL (US); Christian Sacha Penoucos, Miami, FL (US); Juliana Sartori, Port Saint Lucie, FL (US)

(73) Assignee: Zumba Fitness LLC, Hallandale, FL (US)

( * ) Notice: Subject to any disclaimer, the term of this patent is extended or adjusted under 35 U.S.C. 154(b) by 345 days.

(21) Appl. No.: 16/265,460

(22) Filed: Feb. 1, 2019

(65) Prior Publication Data

US 2019/0240539 A1 Aug. 8, 2019

Related U.S. Application Data

(60) Provisional application No. 62/625,539, filed on Feb. 2, 2018.

(51) Int. Cl.
| | | |
|---|---|---|
| *H04N 7/10* | (2006.01) | |
| *H04N 7/025* | (2006.01) | |
| *A63B 24/00* | (2006.01) | |
| *G09B 5/06* | (2006.01) | |
| *H04N 21/472* | (2011.01) | |
| *H04N 21/845* | (2011.01) | |
| *G09B 19/00* | (2006.01) | |
| *H04N 21/8545* | (2011.01) | |
| *H04N 21/81* | (2011.01) | |
| *G06T 13/40* | (2011.01) | |
| *H04N 21/475* | (2011.01) | |
| *H04N 21/482* | (2011.01) | |

(52) U.S. Cl.
CPC .......... *A63B 24/0075* (2013.01); *G06T 13/40* (2013.01); *G09B 5/065* (2013.01); *G09B 19/0038* (2013.01); *H04N 21/472* (2013.01); *H04N 21/4755* (2013.01); *H04N 21/4825* (2013.01); *H04N 21/8133* (2013.01); *H04N 21/8146* (2013.01); *H04N 21/8456* (2013.01); *H04N 21/8545* (2013.01); *A63B 2024/0078* (2013.01); *A63B 2024/0081* (2013.01)

(58) Field of Classification Search
CPC ........ A63B 24/0075; A63B 2024/0078; A63B 2024/0081; G06T 13/40; G09B 5/065; G09B 19/0038; H04N 21/472; H04N 21/4755; H04N 21/4825; H04N 21/8133; H04N 21/8146; H04N 21/8456; H04N 21/8545
See application file for complete search history.

(56) References Cited

U.S. PATENT DOCUMENTS

2007/0016930 A1* 1/2007 Wesemann ............. H04H 60/04
725/46
2007/0042868 A1* 2/2007 Fisher ..................... B62D 1/02
482/8

(Continued)

*Primary Examiner* — Kyu Chae
(74) *Attorney, Agent, or Firm* — RMCK Law Group PLC

(57) ABSTRACT

Methods and systems are provided for facilitating the automated generation of motion-graphics automated training routine content, such as for facilitating the memorization of exercise routines like fitness, dance or other exercise routines.

8 Claims, 14 Drawing Sheets

(56) References Cited

U.S. PATENT DOCUMENTS

| | | | | |
|---|---|---|---|---|
| 2007/0136093 A1* | 6/2007 | Rankin | ............... | G16H 10/20 |
| | | | | 705/2 |
| 2013/0316316 A1* | 11/2013 | Flavell | ............... | G16H 20/30 |
| | | | | 434/247 |
| 2014/0253560 A1* | 9/2014 | Niles | ............... | G06T 13/80 |
| | | | | 345/473 |
| 2014/0355961 A1* | 12/2014 | Paulus | ............... | G06T 13/80 |
| | | | | 386/282 |
| 2018/0122263 A9* | 5/2018 | Shrake | ............... | G09B 19/0092 |
| 2019/0232112 A1* | 8/2019 | Watterson | ............... | A63B 22/0207 |

* cited by examiner

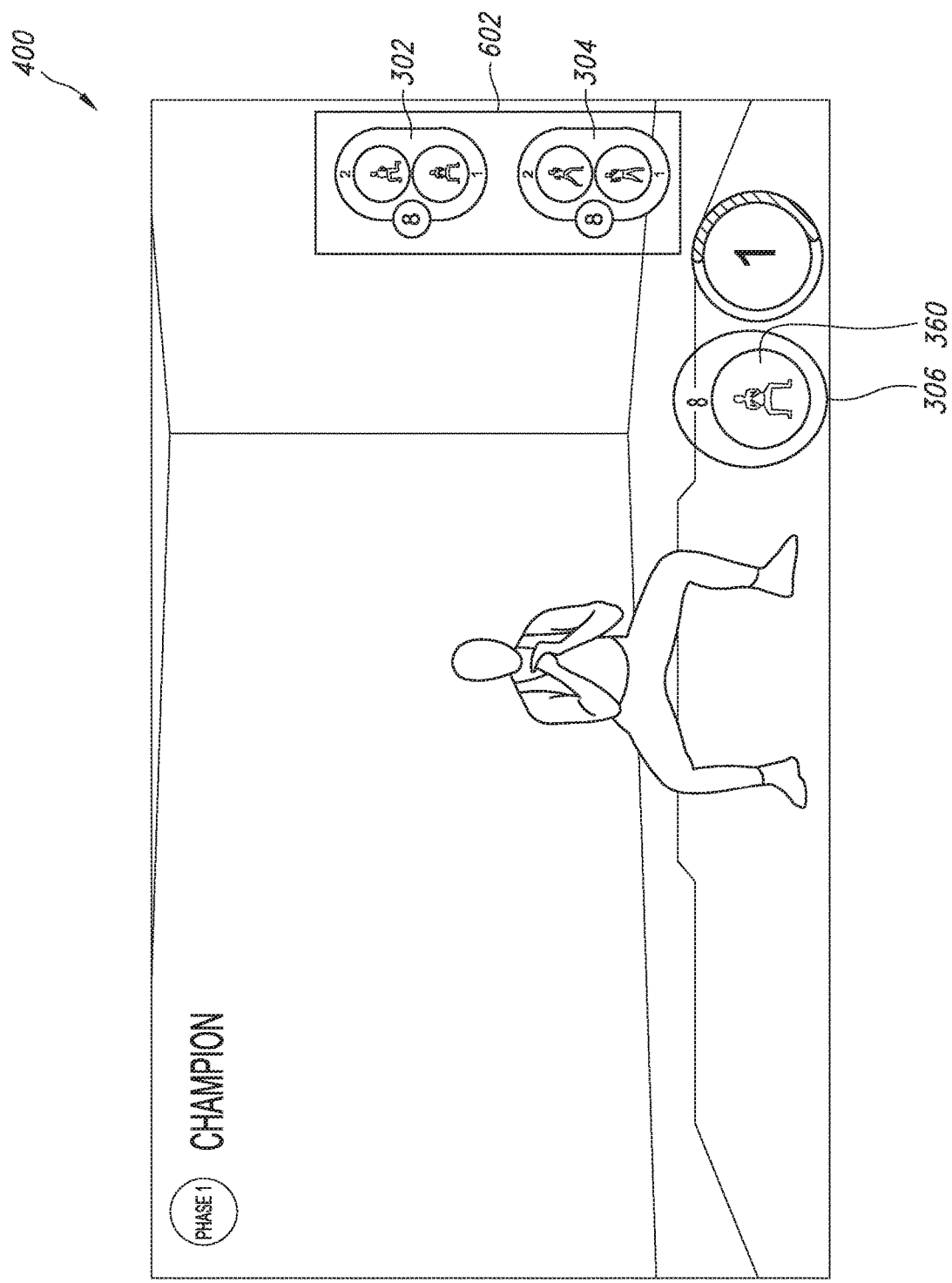

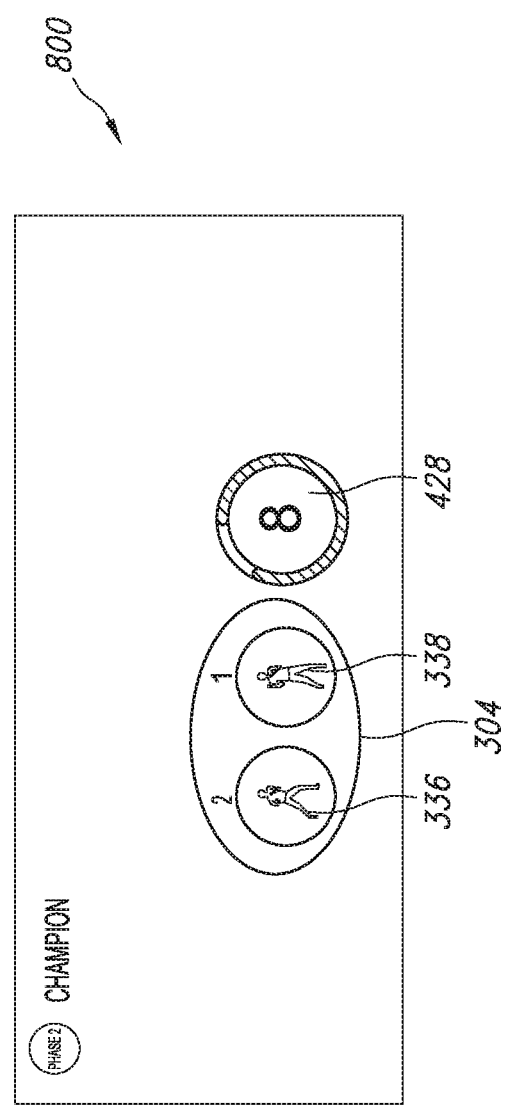

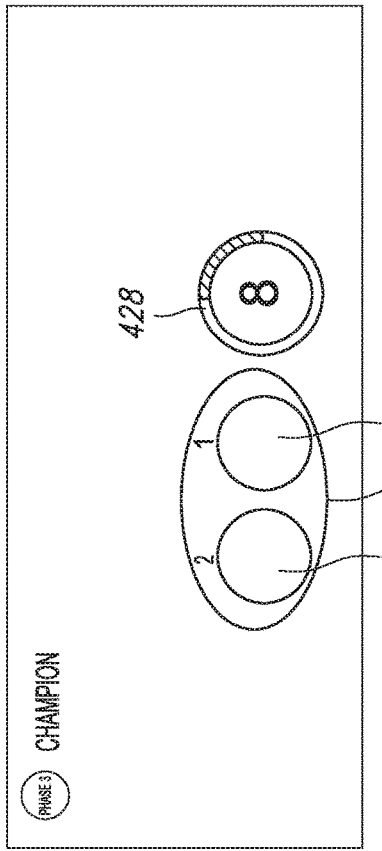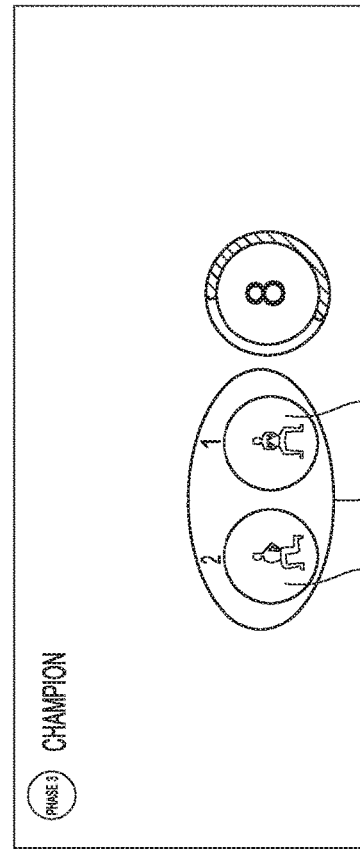

METHODS AND SYSTEMS FOR FACILITATING THE MEMORIZATION OF EXERCISE ROUTINES TO USERS

CROSS-REFERENCE TO RELATED APPLICATION

This application claims the benefit of U.S. Provisional Patent Application Ser. No. 62/625,539, filed Feb. 2, 2018, entitled Methods and Systems for Facilitating the Memorization of Exercise Routines to Users, which is hereby incorporated by reference in its entirety.

TECHNICAL FIELD

This application relates to the field of exercise routine memorization, and more particularly to the methods and systems for facilitating the memorization of exercise routines like fitness, dance, or other exercise routines to users via self-instructing video interfaces.

BACKGROUND

Online education platforms have increasingly gone mainstream and students from around the globe can utilize such platforms for learning new skills. These platforms may create educational content in the form of videos and then provide access to such content and other resources to students through network or internet connected user devices such as laptops or smartphones. The use of quality video recording equipment, phones, and cameras to capture video content and video-processing algorithms to process such content means better content can be generated. This content is then distributed through the internet to instructors/students who might not be able to be physically present to attend the training session/class.

The learning methods as well as the instructional aids for learning new skills have also improved substantially and these new learning systems are both smart and interactive.

The teaching of fitness, dance, and other exercise routines like those of the STRONG by Zumba and Zumba programs have traditionally been done through personal instructors in live classroom settings. Instructors themselves have typically been trained by way of the physical distribution of videos containing exercise routines; however, the existing methods to provide such instruction have proved to be costly and challenging. These methods typically involve capturing the exercise routines performed by an instructor in the form of a video lesson and displaying the same to the user. This mode of rendering exercise instruction fails to capture the effectiveness of interactive training, and the users often end up forgetting the subroutines of a complex exercise routine after watching such recorded video instructions, so that repeated viewings must be made in order to learn a single new routine. This makes learning new exercise routines harder and much less efficient. Time and effort to memorize new routines takes away from the time during which an instructor can conduct live classes for students.

To facilitate teaching instructors and the new routines of others, an exercise routine is typically enhanced with graphical elements, referred to as "motion graphics" or "audio-visual elements" in this disclosure. In embodiments, an exercise routine is repeated throughout a training video, such as three phases, with each phase having different supporting content elements presented on the screen; for example, a six-minute song with accompanying exercise movements would result in an 18-minute training video (if three phases are used) a 24-minute training video (if four phases are used), or the like. Each one of the phases may comprise the full music track, plus accompanying audio-visual elements that assist with exercise routine memorization, where the audio-visual elements vary by phase. For a host or operator wishing to train instructors (so they can efficiently learn a new exercise routine and effectively lead a group exercise class) in multiple songs, the creation of custom motion graphics manually for every routine is very time-consuming and requires extensive manual animation time. Depending on the length of a particular exercise routine, it would take weeks for custom motion graphics to be manually created and added to a video of a routine.

A need exists for improved methods and systems for providing improved instruction systems for users wishing to learn exercise routines as well as for methods and systems for generating such improved instruction systems.

SUMMARY

Methods and systems are provided herein for facilitating the automated generation of motion-graphics automated training routine content, such as for facilitating the memorization of routines like fitness, dance, or other exercise routines. Such methods and systems may be provided to the user by identifying one or more movements/activities, creating combinations and sequences of such movement/activities and then rendering to the user one or more interfaces adapted to display the combination of such movements/activities in a pre-defined sequence to help the user memorize the exercise routine.

In embodiments, methods and systems are provided for automatically generating exercise routine content for training an individual to teach an exercise routine. The methods and systems may include a video editing module for editing a video of an exercise routine, wherein the video editing module prompts the entry of markers for locations for insertion of motion graphics content; and a motion graphics module for creation of motion graphics content that consists of audio-visual elements that aid in memorization of the routine; and the operation and execution of a script to orchestrate the combination of edited video from the video editing module and the audio-visual elements, such that audio-visual elements are automatically added to the video to produce a motion-graphics augmented training routine video. In embodiments, the training routine video is automatically processed to produce a training routine video that comprises a series of segments each comprising a version of the exercise routine. In embodiments, the segments are concatenated to produce the training routine video. In embodiments, the segments are progressively edited to remove at least a subset of at least one of the video content and the audio-visual elements, thereby facilitating memorization of the routine.

In embodiments, the methods for facilitating the memorization of exercise routines comprise breaking the routine to be performed by a trainer/instructor into subroutines, wherein each subroutine comprises one or more movements/activities repeated one or more times; creating video content by capturing a sequence of one or more subroutines performed by the trainer/instructor; processing the video content to include one or more audio-visual aids helping the user to memorize the exercise routine; and rendering the processed video content to the user. In embodiments, the audio-visual aids may commence with a full set of audio-visual aids that is reduced to a subset of audio-visual aids through a series of passes through the exercise routine, such that dependence on the aids is progressively reduced, reflected by shrinking subsets of audio-visual aids that are presented as the user builds knowledge of the routine. In embodiments, the entire routine is represented by a visual aid consisting of icons that represent the main sequence of movements/activities that comprise the routine.

In embodiments, the audio-visual aids comprise avatars/animations of the trainer/instructor performing the exercise routine. The audio-visual aids may also include a repetition number corresponding to one or more movements/activities and subroutines of the exercise routine performed by the trainer/instructor, wherein the repetition number facilitates the user in memorizing repeatable movements/activities and subroutines.

In embodiments, rendering the processed video content to the user include rendering a first interface comprising video content displaying one or more subroutines performed by the trainer/instructor, an animated representation of the subroutine and audio-visual aids; rendering a second interface comprising an animated representation of a subroutine being performed by the trainer/instructor and audio-visual aids; and rendering a third interface comprising intermittent animated representation of a subroutine being performed by the trainer/instructor and audio-visual aids.

In embodiments, the system for facilitating memorization of an exercise routine by a user comprises a database configured to receive video content including the exercise routine of a trainer/instructor; an image editing module configured to generate at least one annotation within at least one video; a motion graphics module configured to superimpose at least one animated image on at least one video using at least one annotation to create processed video content; and a rendering module configured to render the processed video content to the user.

In embodiments, systems for facilitating the memorization of exercise routines are rendered to the user in the form of a self-instructing video content displaying at least one trainer/instructor performing the exercise routine. In embodiments, the video content may be provided to the user through an application on a user device.

In embodiments, the methods and systems disclosed herein include a method for providing personalized instruction aid for assisting a user to memorize an exercise routine. The method includes a. breaking the exercise routine to be performed by a trainer/instructor into subroutines. Each of the subroutines comprises one or more movements/activities repeated one or more times. The method includes b. creating video content by capturing a sequence of one or more subroutines performed by the trainer/instructor; and c. processing the video content to include one or more audio-visual aids helping the user to memorize the exercise routine. The method also includes d. rendering the processed video content to the user.

In embodiments, the audio-visual aids commence with a full set of audio-visual aids that is reduced to a subset of audio-visual aids through a series of passes through the exercise routine.

In embodiments, the method includes providing a visual aid including a sequence of icons, upon completion of the series of passes. In embodiments, the sequence of icons is configured to represent a main sequence of one or more of the movements/activities that comprise the exercise routine.

In embodiments, one or more of the audio-visual aids comprise avatars/animations of the trainer/instructor performing the exercise routine. In embodiments, one or more of the audio-visual aids comprise an animated representation of the subroutines of the exercise routine of the trainer/instructor displayable through a user interface configured to display the processed video content. In embodiments, one or more of the audio-visual aids comprise a time-based progress bar indicating one or more of: a total time required to complete the one or more movements/activities and subroutines; an elapsed time while performing the one or more movements/activities and subroutines; and a remaining time to complete the one or more movements/activities and subroutines.

In embodiments, one or more of the audio-visual aids comprise a repetition number corresponding to one or more movements/activities and subroutines of the exercise routine performed by the trainer/instructor. In embodiments, the repetition number facilitates the user in memorizing repeatable movements/activities and subroutines.

In embodiments, one or more of the audio-visual aids comprise a history bar showing the subroutines displayed on a user interface also configured to display the processed video content.

In embodiments, the rendering the processed video content comprises: rendering a first interface comprising video content displaying one or more of the subroutines performed by the trainer/instructor, an animated representation of the subroutine and one or more of the audio-visual aids; rendering a second interface comprising an animated representation of one of the subroutines being performed by the trainer/instructor and one or more of the audio-visual aids; and rendering a third interface comprising an intermittent animated representation of one of the subroutines being performed by the trainer/instructor and one or more of the audio-visual aids. In embodiments, the first video includes at least a performance of the trainer/instructor physically performing the exercise routine along a predetermined track, and the second and third video include an animated representation of the exercise routine along the predetermined track. In embodiments, the second video displays the animated representation for a complete time required to complete at least the combination of one or more movements/activities and subroutines. In embodiments, the third video displays the animated representation for an instant period of time to complete at least the combination of one or more movements/activities and one or more of the subroutines.

In embodiments, the methods and systems disclosed herein include a method for facilitating memorization of an exercise routine by a user. The method includes a. receiving video content including the exercise routine performed by a trainer/instructor; and b. processing the video content comprising generating at least one annotation within the video content using an image editing module. The method also includes c. superimposing at least one animated image on the video content using at least one annotation; and d. rendering the processed video content to the user through a user interface configured to display the at least one animated image on the video content using the at least one annotation.

In embodiments, the methods and systems disclosed herein include a system for facilitating memorization of an exercise routine by a user. The system includes a database configured to receive video content to a computing device including the exercise routine of a trainer/instructor. The video content includes at least one media file readable by the computing device and comprising at least one video. The system includes an image editing module of the computing device configured to generate at least one annotation within the at least one video; a motion graphics module of the computing device configured to superimpose at least one animated image on the at least one video using the at least one annotation to create processed video content; and a rendering module configured to render the processed video content from the computing device and direct the processed video content to at least one user through a user interface of the computing device that is configured to display the processed video content.

In embodiments, the system includes a processing interface module configured to render an interface to an operator to process at least one instruction corresponding to at least the image editing module, the motion graphics module and a combination thereof. In embodiments, the system includes a user device configured to communicatively coupled to a server through a network and configured to render the processed video content to a user through the user interface of the computing device that is configured to display the processed video content. In embodiments, the system includes a personalization module configured to receive instruction to customize the processed video content based on requirements of the user through the user interface of the computing device.

In embodiments, the systems and methods disclosed herein include a system for automatically generating training routine content for training an individual to teach an exercise routine. The system includes a video editing module associated with a computing device for editing a video of an exercise routine. The video editing module is configured to prompt the entry of markers for locations for insertion of motion graphics content with the computing device. The system includes a motion graphics module for creation of the motion graphics content from the computing device that includes audio-visual elements configured to aid a user in memorization of the routine; and an orchestration module configured to generate at least a portion of a script with the computing device for orchestrating the combination of edited video from the video editing module and the audio-visual elements. The orchestration module automatically adds audio-visual elements to the video with the computing device to produce a motion-graphics augmented training routine video.

In embodiments, the training routine video is automatically processed with the computing device to produce a training routine video that comprises a series of segments each comprising a version of the exercise routine. In embodiments, the segments are concatenated with the computing device to produce the training routine video. In embodiments, the segments are progressively edited with the computing device to remove at least a subset of at least one of the video content and the audio-visual elements. The progressively edited segments in which at least the subset of at least one of the video content and the audio-visual elements are removed to produce a shorter format that facilitates relatively easier memorization of the exercise routine.

Provided herein are methods and systems for providing an exercise routine memorization system that is adapted to display on a device of a user, video content comprising sequences of movements/activities constituting the exercise routine; and a host computing system including at least one server for hosting and managing the video content.

BRIEF DESCRIPTION OF THE FIGURES

In the accompanying figures, like reference numerals refer to identical or functionally similar elements throughout the separate views and together with the detailed description below are incorporated in and form part of the specification, serve to further illustrate various embodiments and to explain various principles and advantages all in accordance with the systems and methods disclosed herein.

FIGS. 6A and 6B illustrate exemplary first user interfaces displaying a history bar of completed subroutines of the exercise routine in accordance with embodiments of the systems and methods disclosed herein.

FIG. 9 illustrates an exemplary second user interface displaying the second subroutine prior to completion of the first subroutine in accordance with embodiments of the systems and methods disclosed herein.

FIGS. 12A and 12B illustrate exemplary third user interfaces displaying the first subroutine in accordance with embodiments of the systems and methods disclosed herein.

Figure 1:
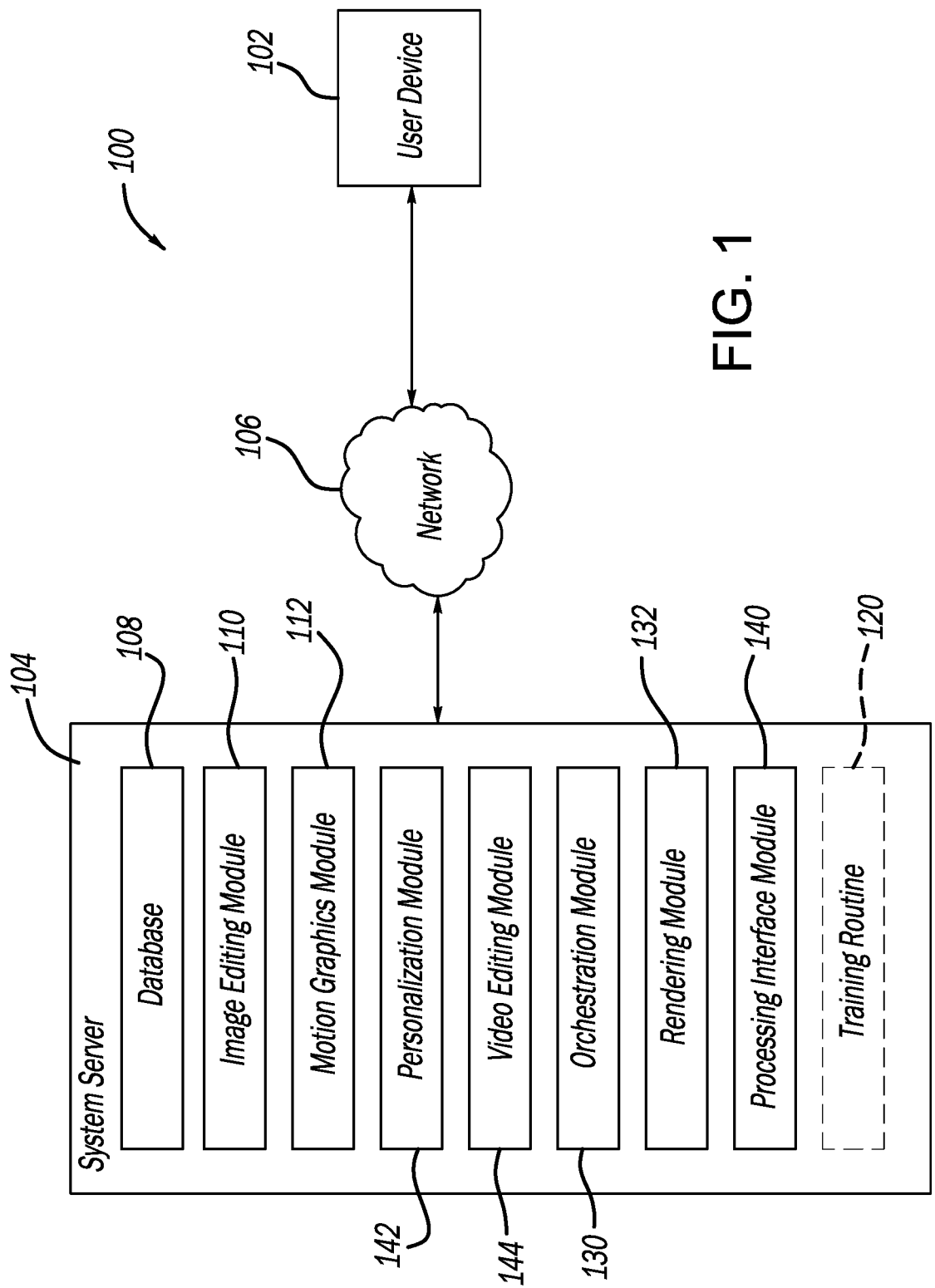
FIG. 1 illustrates an exemplary system architecture for facilitating memorization of exercise routines in accordance with embodiments of the systems and methods disclosed herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the systems and methods disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that the embodiments reside primarily in combinations of method steps and/or system components. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

FIG. 1 illustrates a platform 100 with various systems, modules, components, services, interfaces and other elements for facilitating the creation of audio-visual content that facilitates the memorization of exercise routines in accordance with embodiments of the methods and systems described herein. The platform 100 may support delivery of content for viewing on a user device 102 that is configured to communicatively couple to a system 104 through a network 106. The system 104 may comprise a host system for creation, delivery and management of routines. The system 104 may include various components, which may be integrated into a single information technology infrastructure, such as a server, or may be distributed across various elements, such as cloud-deployed or cloud-connected elements.

The user device 102 may be configured to transmit a request to the system 104 to access video content corresponding to an exercise routine, such as to be performed during a training session, which may be a training session for an instructor who will learn the routine in order to lead students, such as in a live performance. The training session can include one or more exercise routines including but are not limited to fitness routines, dance routines, other exercise routines and combinations thereof. In an embodiment, the video content includes an audio-video file, a multimedia file, an animated video file, metadata and/or combinations or permutations thereof, to facilitate easy memorization of the exercise routines for the user.

On receiving the request, the system 104 may be configured to provide access to the video content to the user device 102. The user device 102 includes a display device for rendering the video content to a user so that the user can view the video content. In an embodiment, the user device 102 can include a computing device such as a personal computer, a laptop or a notebook computer, a mobile or cellular telephone, a personal digital assistant (PDA), or another type of computation or communication device.

The network 106 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Normally, an individual desirous of learning fitness, dance, or other exercise routines needs to review content repeatedly or attend live classes or browse videos on a website to learn and follow the exercise routines. The user may face difficulties in memorizing the exercise routine and struggle with keeping up her performance. Where the user is an instructor, this may take away from time that could be spent teaching live classes for paying students. The methods and systems described herein facilitate memorization of the exercise routine so that a user can effectively and efficiently learn new routines and so that other users can synchronize their exercise routines with the exercise routines performed by the trainer/instructor.

In an embodiment, the systems described herein facilitate the processing of a video recording of a trainer/instructor performing an exercise routine, processing the video recording, and presenting the video content, such as to an instructor or other users. In an embodiment, the system includes an image recording device such as a video or web camera to record the performance of the trainer/instructor while performing the exercise routine. The video content is stored at a database 108 accessible to the system 104. The database 108 is configured to receive video content to a computing device including an exercise routine of a trainer/instructor. The video content can include at least one media file readable by the computing device. Subsequently, the system 104 is configured to process the video content to include one or more audio-visual aids helping the user to memorize the exercise routine.

In embodiments, the system 104 may be configured to facilitate generation of an animated trainer/instructor that carries out an exercise routine that is designed by a user of the system 104 in order to instruct other users to perform the routine.

In an embodiment, the system 104 may be configured to include an image editing module 110 and a motion graphics module 112. The image editing module 110 may be configured to allow a user to generate at least one annotation or marking within the video content of an exercise routine, such as of a trainer performing a new routine 120, and the motion graphics module 112 may be configured to superimpose at least one animated image on the video content, such that a routine is displayed with video of a trainer/instructor and motion graphics that collectively facilitate learning the exercise routine. In an embodiment, the operator of the image editing module 110 may manually insert the annotations at desired time stamps of the video content captured of the routine 120, such as using the image editing module 110. In an embodiment, the motion graphics module 112 is able to read annotations from the image editing module 110 by way of an operator running a script in order to automatically create the final motion graphics. In an embodiment, the operator of the motion graphics module 112 facilitates the operation and execution of a script, such as a Javascript, that is configured to automatically take motion graphics generated using the motion graphics module 112 and apply the motion graphics to the content edited within the image editing module 110. For example, the motion graphics module 112 may be configured by the running of the script to use the annotations or markings in an editing training video (as inserted using the image editing module 110) as markers for the insertion of motion graphics elements that correspond to an applicable section of video. For example, a section of a routine involving a lunge jump may be tagged as "lunge jump" in a marking in the video editing software, and the script may parse the edited video, find the tag, retrieve a motion graphic (like an animation) representing a lunge jump from the motion graphics module 112, and insert the motion graphics element to produce a combined content output. This may be repeated for all elements of a routine to produce a full training routine 120, consisting of a combination of captured (or animated) video and motion graphics elements. The system 104 may be used to create various visual aids such as animated representations of the movements/activities and subroutines, aids representing repetitions numbers corresponding to the movements/activities and subroutines, timing based aids for the respective movements/activities and subroutines, history bar, among other visual aids. Subsequently, the system 104 may be configured to produce the training routine 120, consisting of elements of the training video and added motion graphics, and render or otherwise make available the processed video content to the user device 102, such as optionally over the network 106.

In embodiments, the platform 100 may be used to generate a training video, with motion graphics elements and music, that is adapted to work with a choreographed routine produced by a trainer. For example, the choreography for the training routine 120 can be recorded using standard video recording equipment or, for example, it can be recorded on a camera (such as a cellphone video camera), and then the video can be provided to an operator of the platform 100. The operator may use video of the training routine 120 as an input to the image editing module 110. In embodiments, music for the routine 120 may be provided via the platform 100, such as by a music module 122. Thus, the training routine 120 is recorded, such as on standard video recording equipment or, for example, on a cellphone and then the video is sent with a particular song. In embodiments, the music is timed such that the exercise is exactly on the beat of the music, and sound effects may be provided directly on the beat for what the trainer/instructor is performing. In embodiments, an audio file for music is ingested into the image editing module 110. The operator lays out the music and the video, synchronizing both with the interface of the image editing module 110.

The methods described herein facilitate splitting of the exercise routine performed by a trainer/instructor or generated in animated form into a plurality of subroutines. Each of the subroutines includes one or more movements/activities which are performed by the live trainer/instructor or animated avatar trainer/instructor. The one or more movements/activities can be repeatable movements/activities or non-repeatable movements/activities performed by the trainer/instructor during the training session. Thus, the exercise routine becomes a sequence of subroutines wherein one or more repeatable or non-repeatable movements/activities are performed during the training session. The sequence of subroutines can include repeatable subroutines and non-repeatable subroutines. An objective of the training session is to enable the user to learn the movements/activities and subroutines of the exercise routine in a manner so that the user can efficiently practice the exercise routine even in the absence of a view of the trainer/instructor. The methods and systems described herein enable the user to memorize and practice each and every movement/activity as well as each and every subroutine constituting the exercise routine.

In an embodiment, the system 104 is configured to determine repeatable movements/activities or subroutines and a corresponding number of repetitions for each of the repeatable movements/activities or subroutines from the recorded video content of the trainer/instructor. For example, the trainer/instructor may repeat a first subroutine consecutively or repeat the first subroutine after performing other subroutines during the training session. Similarly, the system 104 is configured to determine non-repeatable movements/activities or subroutines from the recorded video content of the trainer/instructor or from animated routines involving an avatar or other animated trainers/instructors. As discussed later in the description, such determination will enable the system 104 to develop the sequence of movements/activities in the subroutine and a sequence of subroutines in the exercise routine to be performed during the training session.

In an embodiment, the operator manually screens the recorded video and determines the repeatable and non-repeatable movements/activities or subroutines from the recorded video content of the trainer/instructor.

In addition, a duration for each of the repeatable and non-repeatable movements/activities or subroutines is determined at the system 104. For example, the operator may manually screen the recorded video content or the system 104 is configured to execute the motion detection modules to determine the duration for each of the repeatable and non-repeatable movements/activities or subroutines. The determination of durations enables the user to synchronize her performance with the performance of the trainer/instructor while practicing during the training session.

Subsequently, the image editing module 110 is configured to generate annotations at each identified location of the respective repeatable and non-repeatable movements/activities or subroutines found within the recorded video. Further animations are superimposed on the recorded video content using the motion graphics module 112 and the annotation to generate audio-visual aids within the processed video content.

The audio-visual aids include a complete sequence of animated representations of the movements/activities or subroutines performed by the trainer/instructor. In an embodiment, the animated representation includes at least a still image or a motion image representation of each movement/activity or subroutine. The animated representations of the movements/activities or subroutines of the trainer/instructor enable the user to memorize each and every movement/activity as well as each and every subroutine of the exercise routine.

Whenever the user desires to learn and practice an exercise routine that is the subject of a training session, the user via the user device 102 submits a request to the system 104 to access the training session. In embodiments, this may include playing the routine from media on the user device, such as from a disk or other memory media, streaming the routine from the system 104, downloading the routine from the system 104, or the like. In return, the system 104 is configured to render the processed video content to the user device 102 which is configured to display the animated representations and various other content to the user on the display screen. In an embodiment, the system 104 is configured to transmit the recorded video of the exercise routine in combination with the animated videos.

In another embodiment, the system 104 is configured to transmit the processed video content to the user device 102 in a form of three user interfaces. Each of the movements/activities or subroutines are shown in three user interfaces. Each of the interfaces assists in aiding memorization of the exercise routine of the training session.

In embodiments, the system 104 can include an orchestration module 130 that is configured to generate at least a portion of a script with the computing device for orchestrating the combination of edited video from the video editing module and the audio-visual elements, wherein the orchestration module automatically adds audio-visual elements to the video with the computing device to produce a motion-graphics augmented training routine video. The system 104 can also include a rendering module 132 that is configured to render the processed video content from the computing device and direct the processed video content to at least one user through a user interface of the computing device that is configured to display the processed video content. The system 104 can also include a processing interface module 140 that is configured to render an interface to an operator to process at least one instruction corresponding to at least the image editing module 110, the motion graphics module 112 and a combination thereof. The system can also include a personalization module 142 that is configured to receive instruction to customize the processed video content based on requirements of the user through the user interface of the computing device. A video editing module 144 is configured to edit a video of an exercise routine. The video editing module 144 is configured to prompt entry of markers for locations for insertion of motion graphics content with the computing device.

The first interface includes a first animated video displaying the trainer/instructor performing the training session in combination with the animated representation of the movements/activities and subroutines performed by the trainer/instructor during the training session. The objective of the first animated video is for the user (such as an instructor or student) to learn the exercise routine by observing the trainer/instructor (real or animated) depicted in the routine and memorizing the animated representation of the movements/activities and subroutines of the exercise routine along with a predetermined track.

The second interface includes a second animated video segment displaying a continuous display of the sequence of the animated representation of the movements/activities and subroutines of the exercise routine. Specifically, the second animated video does not include the depiction of the trainer/instructor. That is, a subset of content is now presented, deleting the trainer/instructor, but leaving other audio-visual cues and elements that facilitate remembering what the trainer/instructor was doing in the first video segment. The objective of the second animated video segment is to ensure that the user performs the exercise routine herself while observing the animated representation of the movements/activities and subroutines. Since the user is not able to access the trainer/instructor performance while watching the second animated video, the second animated video facilitates in memorizing the exercise routine through the animated representations of the movements/activities and the subroutines. The animated representation of the movements/activities and subroutines in the second video acts as a memory stimulator for the user so that the user can ready herself to perform the movements/activities or subroutines using the respective animations.

In embodiment, a third interface includes a third animated video segment displaying the animated representation of the movements/activities and subroutines in such a manner that the animated representation of the movements/activities and subroutines are not persistently visible to the user when a respective movement/activity or subroutine needs to be performed along with a soundtrack, such that the representative animations are made visible to the user only for a short period of time so that the user can verify that he or she is doing the right movement/activity or the right subroutine at the right time during the training session. Since the third animated video segment neither displays the trainer/instructor performing the movement/activity or subroutine nor a continuous display of the animated representation of the movements/activities and subroutines involved in the training session, the third animated video segment confirms the user's memorization of the exercise routine, aided only by minimal visual prompts. If the user is not practicing as per the trainer/instructor in the training session, an intermittent display of the animated representation of the movements/activities and subroutines enables the user to correct his or her performance in accordance with the movements/activities of the trainer/instructor.

In another embodiment, the aforementioned videos, including the recorded video and animated videos of the training session or generated animated content for animated training sessions, may be delivered to the user in an offline mode in a storage device. The client computing device is configured to access the storage device to access the video to practice and learn the subroutines performed by a trainer/instructor during the training session.

In an alternate embodiment, the user device 102 is configured to install a mobile application so that the mobile application is configured to access the storage device in an offline mode or to the system 104 in an online mode to access the videos of the training session.

Figure 2:
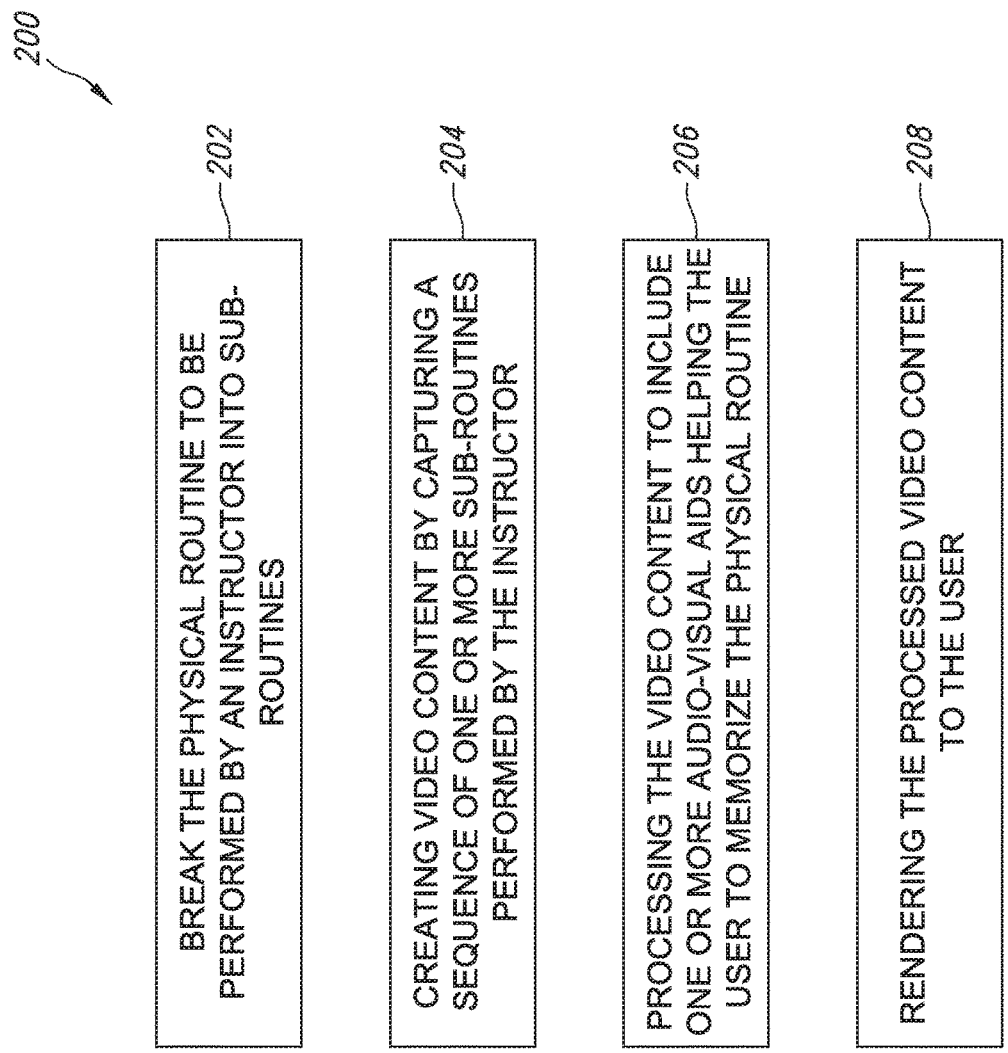
FIG. 2 illustrates exemplary methodologies for facilitating memorization of exercise routines in accordance with embodiments of the systems and methods disclosed herein.

FIG. 2 illustrates exemplary methodologies for facilitating memorization of exercise routines in accordance with embodiments of the systems and methods disclosed herein. The method 200 initiates at 202. At 202, an exercise routine is broken into a plurality of subroutines. Each subroutine of the plurality of subroutines includes one or more repeatable or non-repeatable movements/activities performed by a trainer/instructor during a training session.

At 204, video content is created by capturing the sequence of one or more subroutines performed by the trainer/instructor. For example, the system 104 is configured to access an image recording device to record the video and subsequently, store the video in the database 108.

At 206, the video content is processed to include one or more audio-visual aids helping the user to memorize the exercise routine. The audio-visual includes at least animated representations of the movements/activities and subroutines of the exercise routine of the trainer/instructor. In embodiments, addition of audio-visual aids may include a process by which markers or annotations may be added to a media content file or other objects, such that the object may be automatically processed to add audio-visual elements at appropriate locations by parsing the file, identifying the markers, and inserting elements that either provide, or link to, sources of audio-visual elements. Audio-visual elements may be configured by a user, such as in a user interface, of the system 104, such that they may be defined for a given routine (e.g., elements representing particular exercise moves) and then automatically added to a media content file based on parsing the file for markers or the like.

At 208, the processed video content is rendered to the user.

Figure 3:
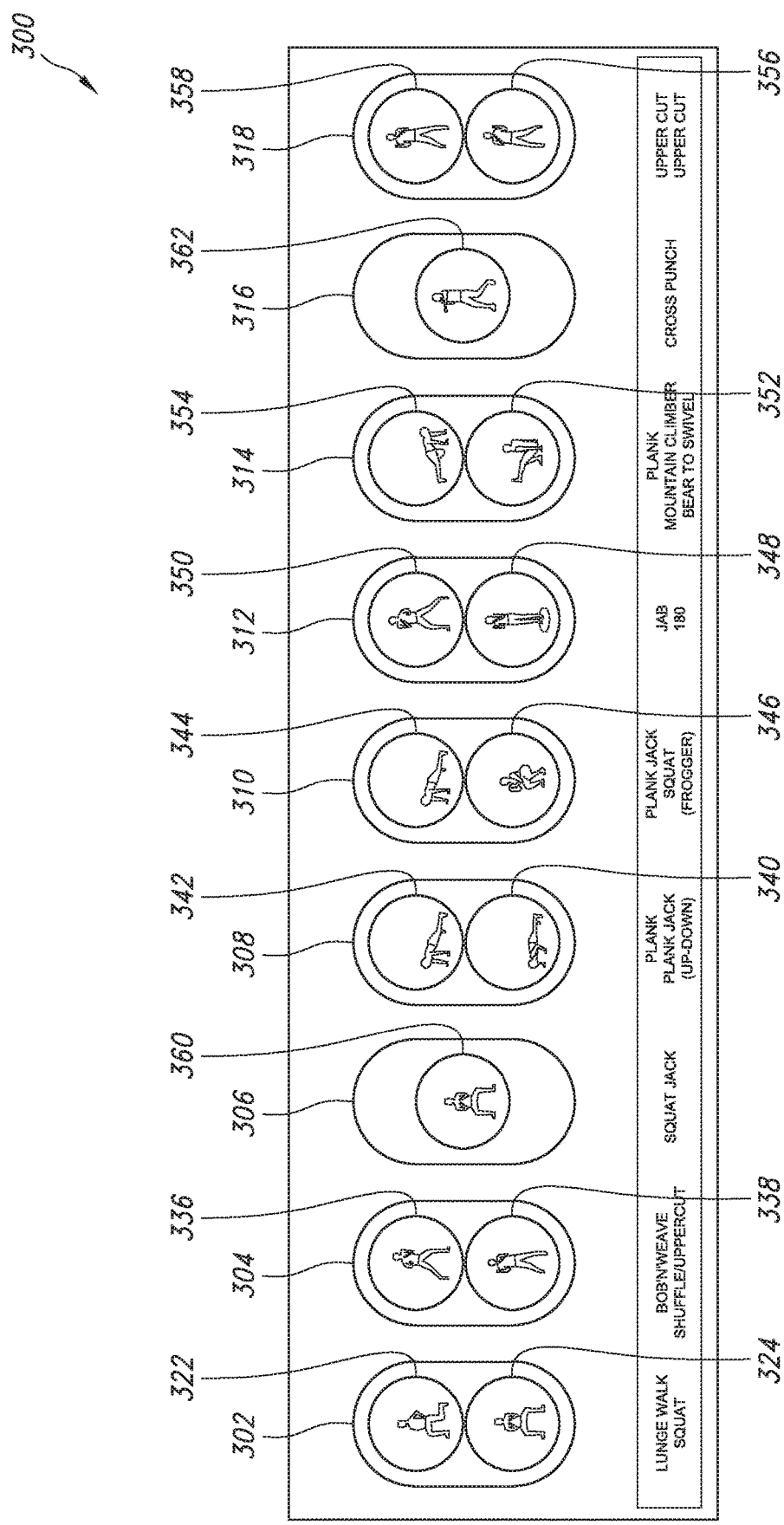
FIG. 3 illustrates an exemplary user interface displaying an animated representation of the exercise routine in accordance with embodiments of the systems and methods disclosed herein.

FIG. 3 illustrates examples of a user interface 300 displaying an animated representation of the exercise routine in accordance with embodiments of the systems and methods disclosed herein. In an embodiment, for a specific exercise routine to be performed by the trainer/instructor or a routine generated in an animation or other systems, at least three different user interfaces are shown to the user so that the user can memorize each movement/activity as well as the subroutine of the exercise routine. Each of the three different user interfaces is shown to the user for a defined track period in which the user practices the movements/activities and attempts to memorize the movements/activities, subroutines and the sequence of movements/activities using the visual aids shown to the user.

Before the start of the training session, an entire animated sequence of the movements/activities and subroutines required to be performed as a part of the exercise routine are displayed to the user. This provides the user an overview and can aid the user in memorizing the combination of movements/activities or subroutines involved in the exercise routine. As illustrated in FIG. 3, the various subroutine combinations such as Lunge Walk Squat, Bob-n-Weave Shuffle/Upper Cut, Squat Jack, Plank Plank Jack, Plank Jack Squat, Jab 180, Plank/Mountain Climber Bear to Swivel, Cross Punch and Upper Cut are displayed to the user. Further, each of these subroutines includes one or more movements/activities. Furthermore, each movement/activity is shown by a respective animated representation. The animated representation enables the user to memorize the movements/activities involved in the respective subroutines in a relatively efficient and effective manner. In addition, various subroutines such as subroutines 302, 304, 308, 310, 312, 314, and 318 include two movements/activities. For example, the subroutine 302 includes a movement/activity 322 and a movement/activity 324. The subroutines 304 may include a movement/activity 336 and a movement/activity 338. The subroutines 308 may include a movement/activity 340 and a movement/activity 342. The subroutines 310 may include a movement/activity 344 and a movement/activity 346. The subroutines 312 may include a movement/activity 348 and a movement/activity 350. The subroutines 314 may include a movement/activity 352 and a movement/activity 354. The subroutines 318 may include movements/activities, such as a movement/activity 356 and a movement/ activity 358. The subroutine 306 may include a movement/activity 360 and the subroutine 316 may include a movement/activity 362.

The overview of the various subroutines indicates that the user will have to perform a first movement/activity, such as the movement/activity 322 of the subroutine 302 and subsequently, a second movement/activity, for example, the movement/activity 324 of the subroutine 302. Once all the movements/activities of the subroutine 302 are performed, the user is required to perform the next subroutine 304 of the sequence. Thus, the user is required to memorize the sequence of the subroutines and the respective movements/activities to perform the exercise routine in a manner as performed by the trainer/instructor.

Figure 4:
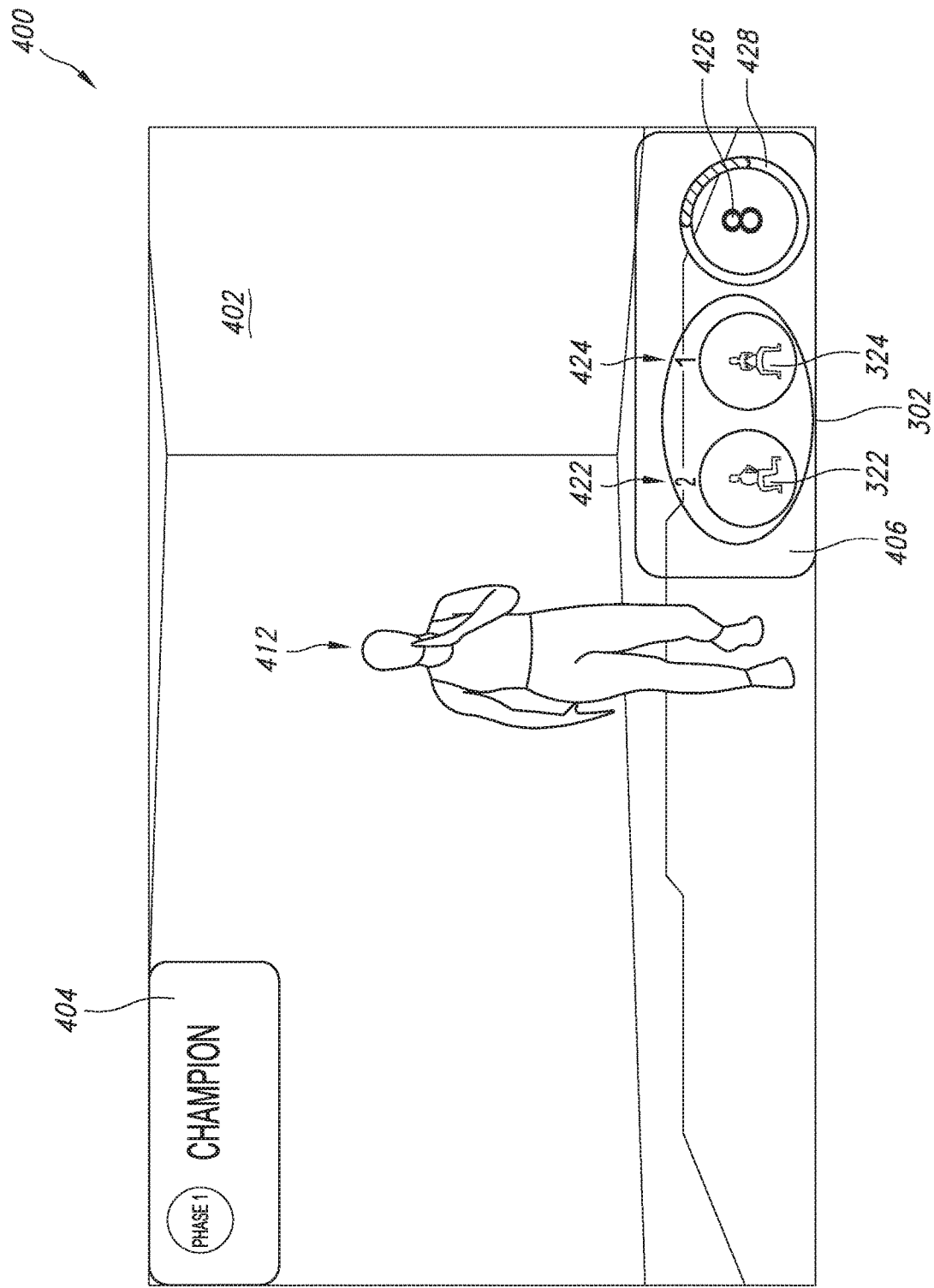
FIG. 4 illustrates an exemplary first user interface displaying a first subroutine of the exercise routine in accordance with embodiments of the systems and methods disclosed herein.

FIG. 4 illustrates an exemplary first user interface 400 displayed on the user device 102 in accordance with embodiments of the methods and systems described herein. The first user interface 400 includes a portion 402, a portion 404 and a portion 406. The portion 402 illustrates a trainer/instructor 412 performing the one or more subroutines involved in the training session. As an example, and not as a limitation, the trainer/instructor 412 is performing an exercise so that the user can get trained to master the subroutines involved in performing the exercise. When the first animated video is played on the display screen, the user may learn the subroutines as performed by the trainer/instructor 412. Alternatively, the user may perform along with the performance of the trainer/instructor 412 so that the user can match his performance with the performance of the trainer/instructor 412. The portion 404 of the first user interface 400 includes details of the training session being given to the user. The details of the training session can include but are not limited to a name of the session, a phase of the session, brief description of the session, duration of the session and similar brief information aspects of the training session.

In embodiments, the portion 406 of the first user interface 400 includes the animated representation of the subroutines being performed by the trainer/instructor at a current time. For example, the trainer/instructor is performing the subroutine 302 at the current time. Since the subroutine 302 includes the movement/activity 322 and the movement/activity 324, the portion 406 facilitates the user in registering the animated representation of the movements/activities in the memory in a relatively efficient and effective manner. Further, visual aids 426 and 428 are illustrated. The visual aid 426 indicates to the user that the subroutine 302 is to be repeated eight times and the visual aid 428 indicates to the user the total time to complete the subroutine 302 and the remaining time to complete the subroutine 302. The timing-based visual aid 428 allows the user to complete her performance with the performance of the trainer/instructor in a timely manner and to teach her mind regarding the timings involved for each subroutine. Thus, the portion 406 enables the user to memorize the movements/activities of the subroutine, the number of times the movements/activities of the subroutine must be repeated, and the timings involved while performing the subroutine.

Figure 5:
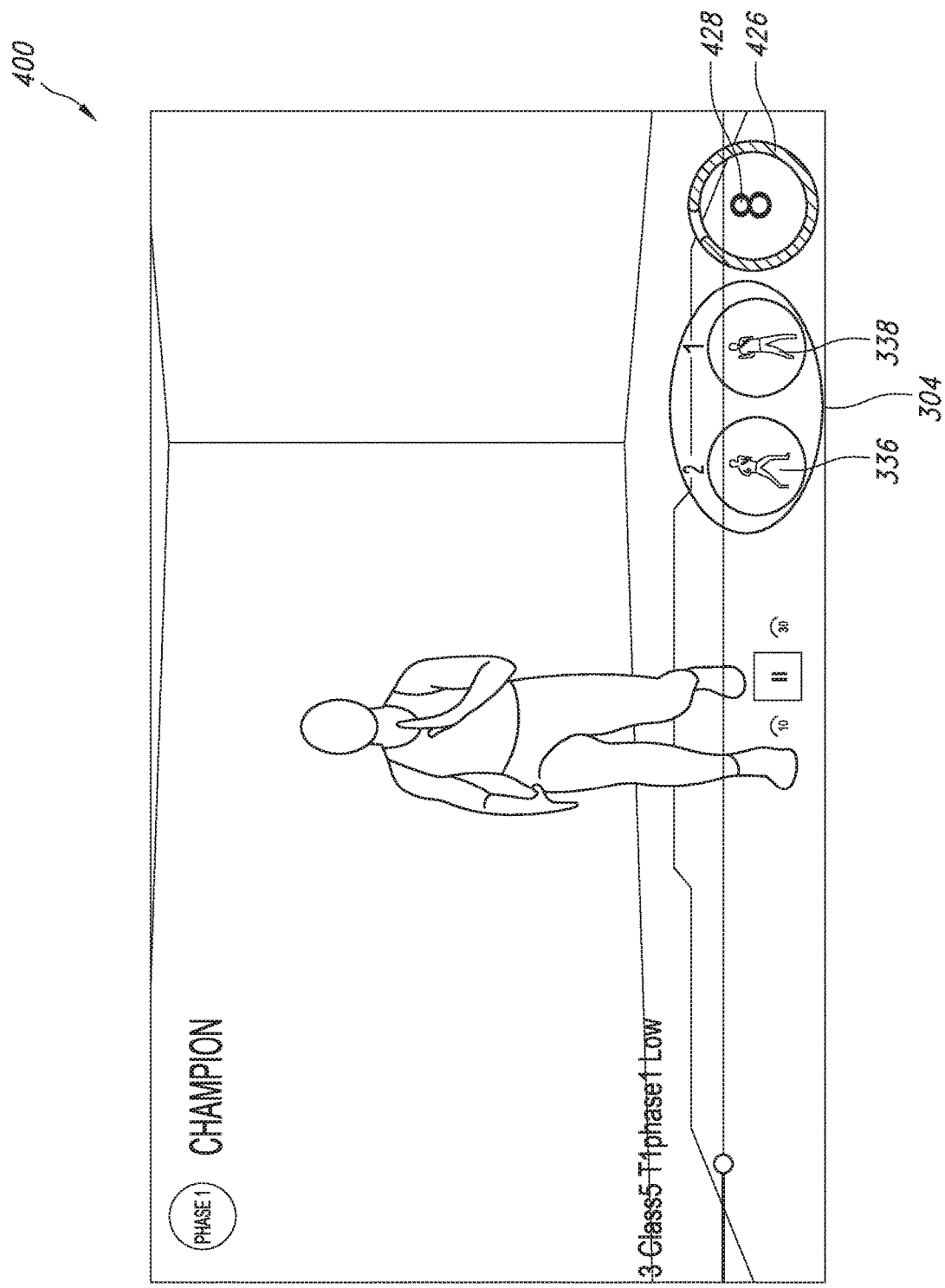
FIG. 5 illustrates an exemplary first user interface displaying a second subroutine prior to completion of the first subroutine in accordance with embodiments of the systems and methods disclosed herein.

FIG. 5 illustrates examples of a first user interface 400 displaying a second subroutine 304 prior to completion of the first subroutine 302 in accordance with embodiments of the systems and methods disclosed herein. As illustrated, the subroutine 304 is shown to the user just before completion of the subroutine 302. The visual aids 426 and 428 still refers to the repetition number and timing related information corresponding to the subroutine 302 respectively. Since the amount of remaining time to complete the subroutine 302 is almost minimal, the user interface 502 illustrates the subroutine 304 to the user so that the user can mentally prepare herself regarding the movements/activities 336 and 338 of the subroutine 304. As soon as the subroutine 302 is completed, the user is required to switch to the movements/ activities involved in the subroutine 304. As shown, the user is required to perform the movement/activity 336 two times and the movement/activity 338 one time to complete one cycle of the subroutine 304. An advance intimation of the next subroutine to the user in the user interface enables the user to prepare herself as well as memorize the sequence of subroutines in a relatively efficient and effective manner.

Figure 6A:
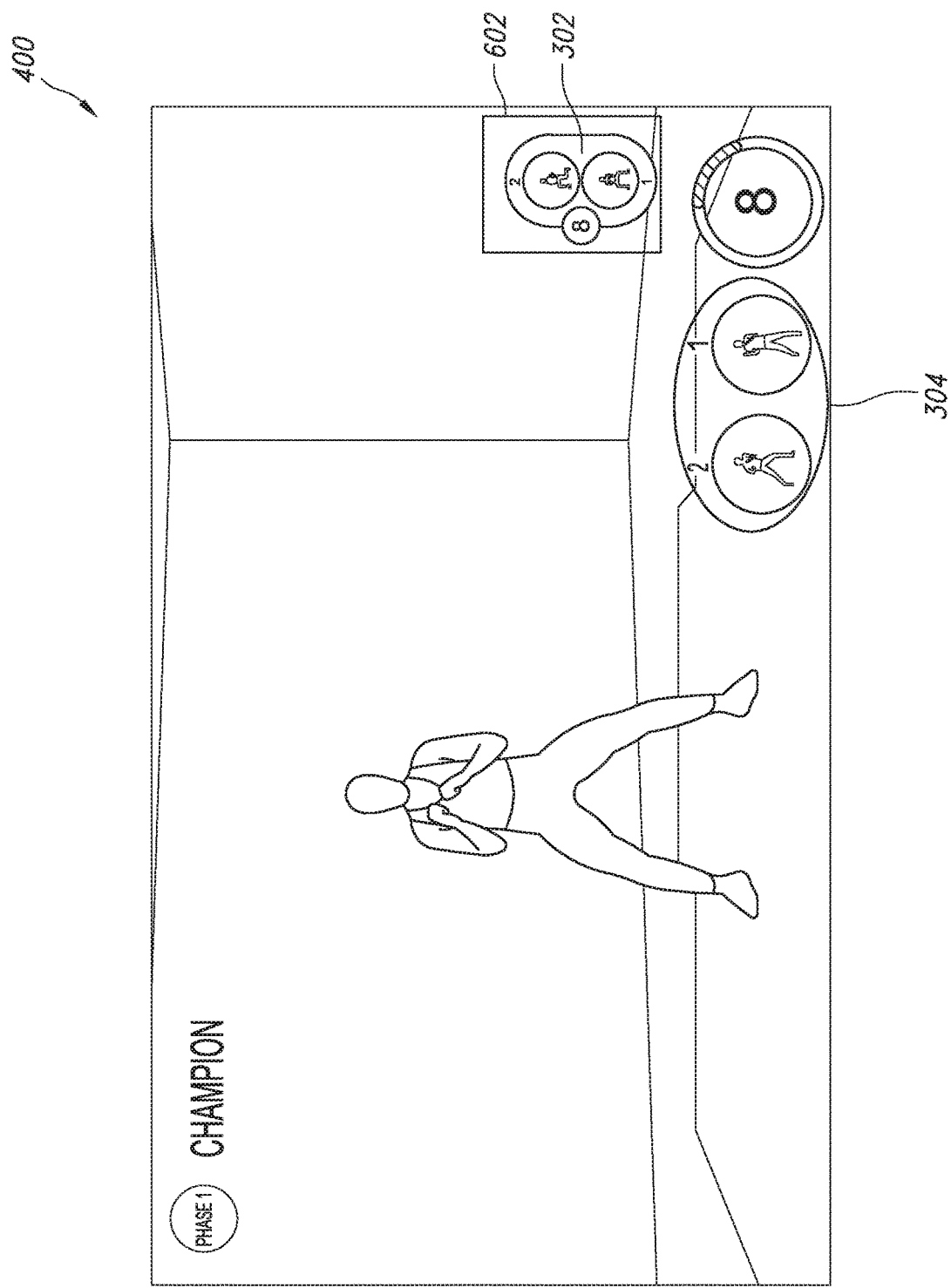

FIGS. 6A and 6B illustrate examples of first user interfaces 400 displaying a history bar 602 of completed subroutines of the exercise routine in accordance with embodiments of the systems and methods disclosed herein. The history bar 602 includes a list of recently completed subroutines of the exercise routine. Although the history bar 602 is shown as a vertical list of completed subroutines, the history bar 602 can be shown as a horizontally placed list of completed subroutines. As soon as the user refers to history bar 602, the user can memorize the recently completed subroutines of the exercise routine and thus, the history bar 602 acts as another form of the visual aid facilitating in memorization of the subroutines of the exercise routine. Moreover, the history bar 602 includes animated representations of the movements/activities involved in the subroutine and the history bar 602 is displayed to the user until completion of the soundtrack of the exercise routine. A continuous display of the animated representations of the movements/activities in a sequential manner in a form of the history bar 602 continuously feeds information into the memory of the user regarding the exercise routine. As a result, the user can refer to the history bar 602 to refresh her memory regarding the movements/activities and subroutines without referring to the actual performance of the trainer/ instructor while the user is practicing the exercise routine.

As illustrated, the history bar 602 of the FIG. 6A indicates that the trainer/instructor has completed the subroutine 302. Further, the user interface of the FIG. 6A indicates that the trainer/instructor is now performing the subroutine 304 which is to be repeated eight times. The history bar 602 of the FIG. 6B indicates that the trainer/instructor has completed the subroutine 302 and the subroutine 304. Further, the trainer/instructor is performing the subroutine 306 which includes a single movement/activity 360. The single movement/activity 360 is to be repeated eight times whereas the subroutine 306 is to be performed only once. As the user is also performing with the trainer/instructor, the user's focus on the history bar 602 will make her realize that the user has completed movements/activities of the subroutines listed in the history bar 602. This constant visual feeding of the movements/activities and subroutines in the form of the history bar 602 enables the user to grasp the exercise routine in a highly efficient and effective manner.

Figure 7:
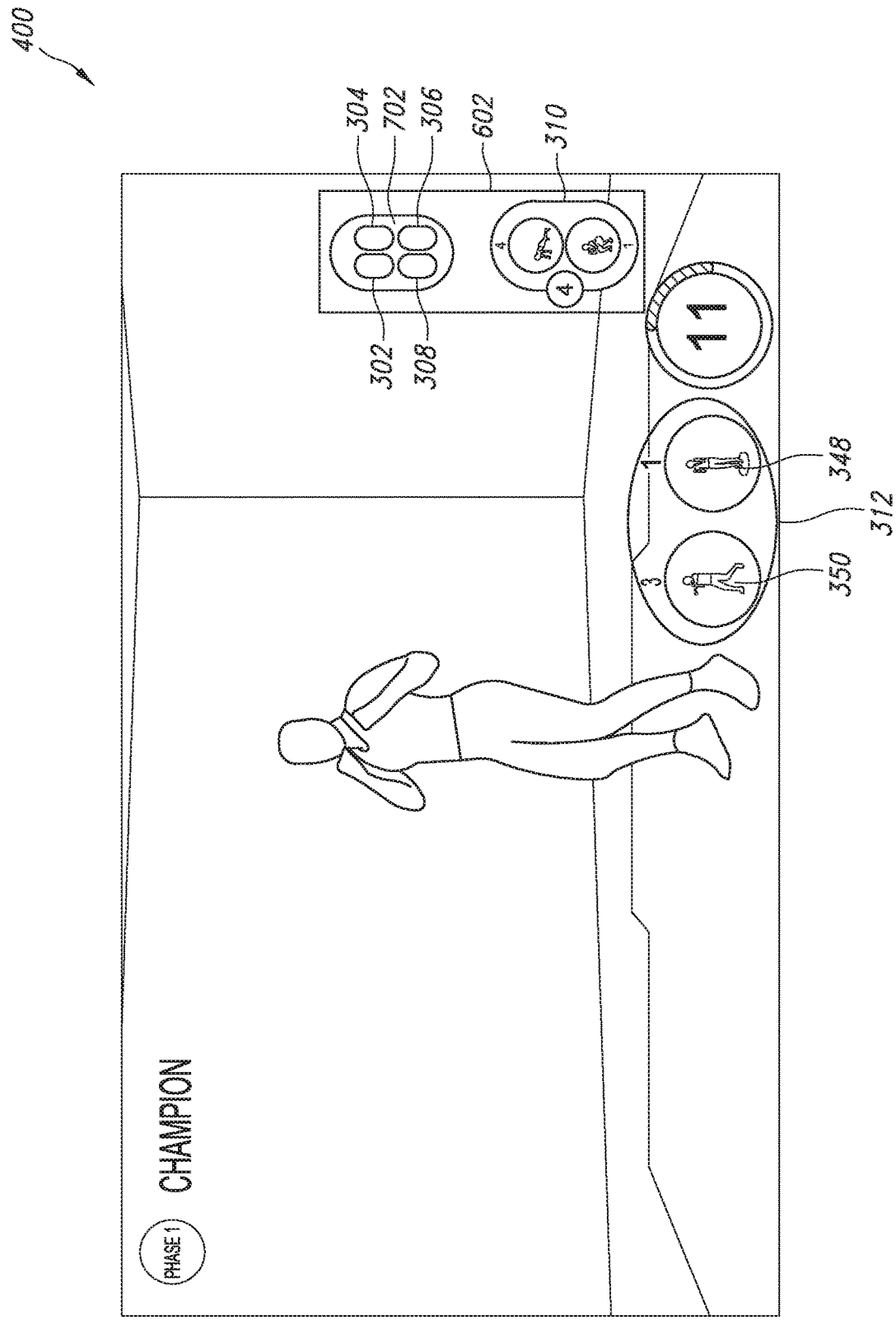
FIG. 7 illustrates an exemplary first user interface displaying a visual aid indicating a group of completed subroutines in the history bar in accordance with embodiments of the systems and methods disclosed herein.

FIG. 7 illustrates examples a first user interface 400 displaying a visual aid 702 indicating a group of completed subroutines in the history bar 602 in accordance with embodiments of the systems and methods disclosed herein. The visual aid 702 includes the recently completed subroutines such as the subroutine 302, the subroutine 304, the subroutine 306 and the subroutine 308. The history bar 602 includes the visual aid 702 and the recently completed subroutine 310. In an embodiment, the visual aid 702 may indicate to the user that the group of completed subroutines are likely to be repeated in the same track of the exercise routine. As a result, the visual aid 702 acts as an additional facilitation tool for memorizing the subroutines of the exercise routine. Further, FIG. 7 illustrates that the trainer/ instructor is performing the subroutine 312 which includes the movement/activity 348 and the movement/activity 350. The movement/activity 348 is to be performed once and the movement/activity 350 is to be performed three times in a single cycle of the subroutine 312. The subroutine 312 is to be performed eleven times by the user.

Figure 8A:
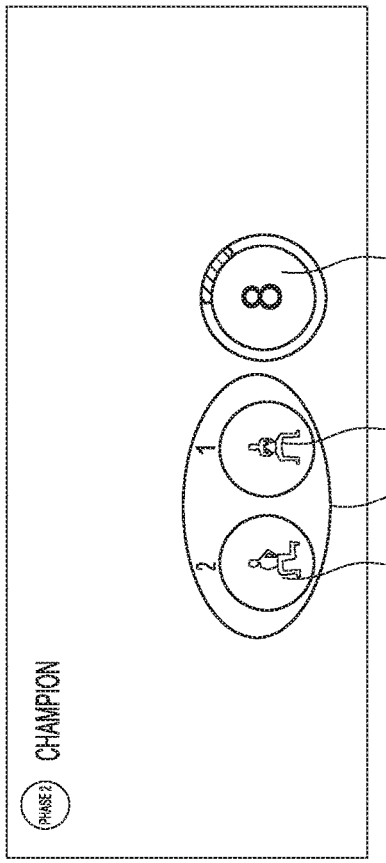
FIGS. 8A and 8B illustrate exemplary second user interfaces displaying the first subroutine in accordance with embodiments of the systems and methods disclosed herein.
Figure 8B:
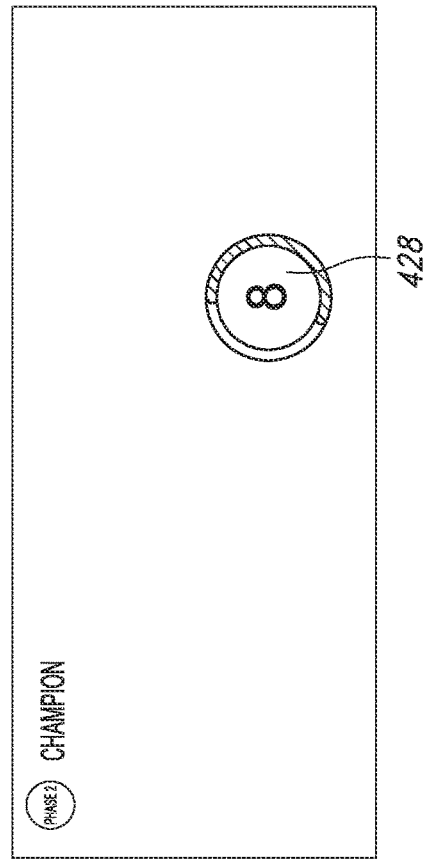

FIGS. 8A and 8B illustrate exemplary second user interfaces 800 displaying the first subroutine 302 in accordance with embodiments of the systems and methods disclosed herein. As illustrated, the second user interface 800 includes animated representations of the movements/activities of the subroutine and does not include visual images disclosing the performance of the trainer/instructor. The second user interface 800 is shown to the user after completion of a first instance of the soundtrack wherein the user gets access to the first user interface 400 displaying performance of the trainer/ instructor along with the animated representations of the movements/activities and subroutines of the exercise routine. After completion of the first instance of the soundtrack, a second instance of the soundtrack is started and the second user interface 800 is shown to the user so that the user can practice on her own while referring to the animated representations of the movements/activities and subroutines but without viewing the performance of the trainer/instructor.

In embodiments, the user attunes herself to the music played during the display of the second user interface 800 and performs in accordance with the animated presentations of the movements/activities and the subroutines displayed on the second user interface 800. As the user starts performing the subroutine 302, the second user interface 800 displays to the user the movements/activities 322 and 324 associated with the subroutine 302 for a brief period. After the expiry of the brief period, the animated representations of the movements/activities 322 and 324 are made invisible to the user. Thus, the second user interface 800 acts as an additional facilitation tool for the user to memorize the movements/activities of the subroutines. As illustrated in FIG. 8A, at the start of the subroutine 302, animated representations of the movements/activities 322 and 324 in combination with the visual aid 428 are shown to the user, whereas FIG. 8B illustrates that the after the expiry of the brief period, only the visual aid 428 corresponding to the subroutine 302 is shown. The key difference between the first user interface 400 and the second user interface 800 is that the first user interface 40 is shown to the user so that the user can learn the various movements/activities and subroutines by viewing the performance of the trainer/instructor and memorize animated representations of the respective movements/activities of the trainer/instructor, whereas the second user interface 800 is shown to the user so that user can practice the exercise routine without even looking at the performance of the trainer/instructor and moreover, the animated representations are made invisible to the user after the expiry of the brief period so that the user can memorize the movements/activities along the second instance of the soundtrack being run while displaying the visual aids on the second user interface 800.

FIG. 9 illustrates an exemplary second user interface 800 displaying the second subroutine 304 prior to completion of the first subroutine 302 in accordance with embodiments of the systems and methods disclosed herein. The second user interface 800 of FIG. 9 is similar to the first user interface 400 of FIG. 5 except that in the second user interface 800, the user performs the exercise routine while following the soundtrack in the absence of the trainer/instructor performing the exercise routine whereas, in the user interface of FIG. 5, the user practices the exercise routine while observing the trainer/instructor and the animated representations. As illustrated in FIG. 9, the subroutine 304 is shown to the user just before the completion of the subroutine 302. The visual aid 428 indicates the remaining time to complete the subroutine 302. Thus, the user is now aware of the fact that as soon as the visual aid 428 indicates completion of the subroutine 302, the user needs to shift to the movements/activities 336 and 338 of the subroutine 304.

Figure 10:
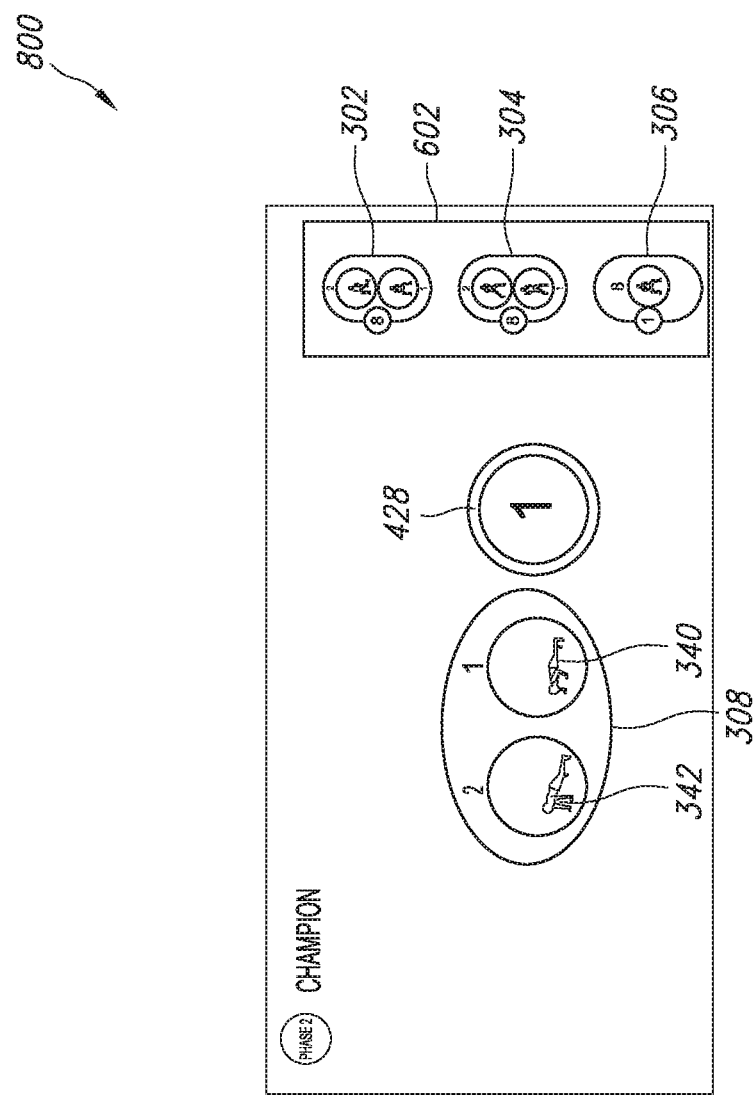
FIG. 10 illustrates an exemplary second user interface displaying a fourth subroutine and the history bar of the completed subroutines of the exercise routine in accordance with embodiments of the systems and methods disclosed herein.

FIG. 10 illustrates an exemplary second user interface 800 displaying a fourth subroutine 308 and the history bar 602 of the completed subroutines of the exercise routine in accordance with embodiments of the systems and methods disclosed herein. The history bar 602 indicates that the user has already completed the subroutine 302, the subroutine 304 and the subroutine 306. In addition, the history bar 602 indicates the animated representations of the movements/activities of the respective subroutines and the respective number of repeats for each of the movements/activities as well as the subroutines. Further, the second user interface 800 indicates that the user has just started the subroutine 308 which includes the movements/activities 340 and 342. The user is required to repeat the movement/activity 340 four times and the movement/activity 342 one time for a single cycle of the subroutine 308. The visual aid 428 indicates that the user is required to complete the subroutine 308 within the time as determined by the progress indicator shown on the visual aid 428. Thus, the second user interface further enhances the memorization capacity of the user to perform the movements/activities without referring to the performance of the trainer/instructor.

Figure 11:
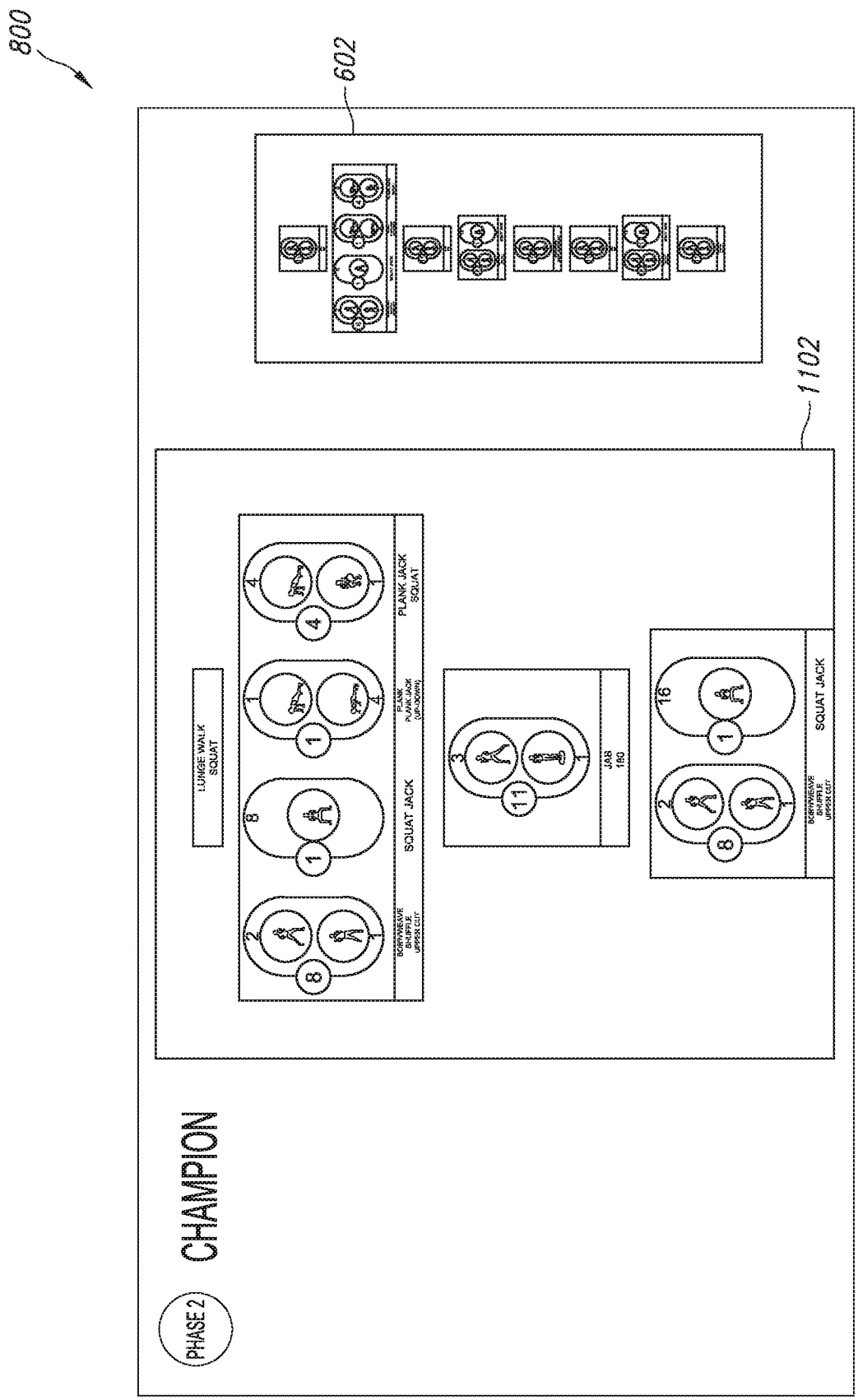
FIG. 11 illustrates an exemplary second user interface displaying a sequence of subroutines, respective movements/activities of the subroutines and the history bar in accordance with embodiments of the systems and methods disclosed herein.

FIG. 11 illustrates an exemplary second user interface 800 displaying a sequence of subroutines, respective movements/activities of the subroutines and the history bar in accordance with embodiments of the systems and methods disclosed herein. Specifically, the second user interface 800 includes a visual aid 1102 which is shown to the user upon completion of the second instance of the soundtrack which indicates that the user has gone through the various movements/activities and the subroutines in a sequential manner as indicated in the visual aid 1102. The visual aid 1102 is an in-motion history bar so that the user can memorize the sequence of completed movements/activities and subroutines of the exercise routine. Further, the second user interface 800 illustrates the history bar 602 disclosing the sequence of subroutines and the respective movements/activities of the subroutines. Moreover, the various subroutines are combined in a group and shown to the user in the visual aid 1102 and the history bar 602.

FIGS. 12A and 12B illustrate exemplary third user interfaces 1200 displaying the first subroutine 302 in accordance with embodiments of the systems and methods disclosed herein. The third user interface 1200 is shown to the user after the completion of the second instance of the soundtrack and on the start of a third instance of the soundtrack. The objective of the third user interface 1200 is to facilitate the user to practice the movements/activities and subroutines of the exercise routine using the beats of the soundtrack only. That is why, the third user interface 1200 neither displays the trainer's/instructor's performance nor the animated representations of the trainer's/instructor's performance while the third instance of the soundtrack is played for the user. As illustrated in FIG. 12A, the subroutine 302 is shown to the user without displaying the animated representations of the movements/activities 322 and 324 of the subroutine 302. As a result, the third user interface 1200 facilitates the memorization of the movements/activities involved in the subroutine 302. The only source of information for the user is his or her capacity to recall the movements/activities being performed along with the soundtrack. Based on his or her recall power, the user performs the movements/activities of the subroutine 302. However, to facilitate that the user is performing right type of movements/activities for the subroutine 302, an intermittent display of the animated representations of the movements/activities are shown to the user so that the user can verify his or her performance with the animated representations. If the user is not performing the required movement/activity involved in the subroutine 302, the intermittent display of the animated representations enables the user to correct his or her performance. Thus, the intermittent display of the animated representations of the movements/activities of the subroutine acts as an additional visual aid for the user to memorize the movements/activities involved in the subroutine.

Figure 13:
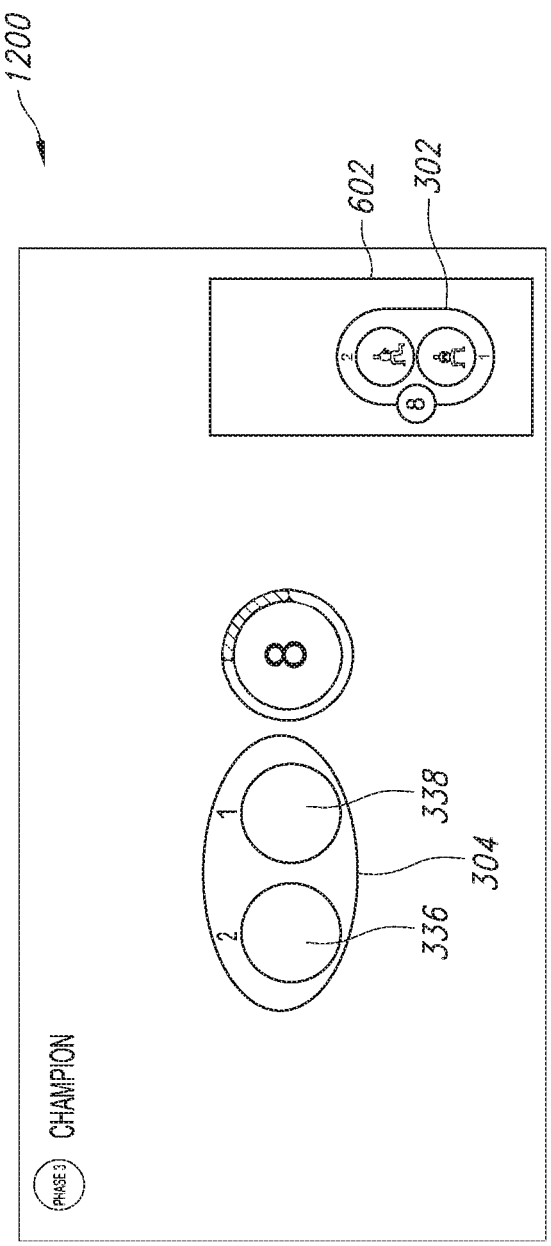
FIG. 13 illustrates an exemplary third user interface displaying the second subroutine and the history bar in accordance with embodiments of the systems and methods disclosed herein.

FIG. 13 illustrates exemplary third user interface 1200 displaying the second subroutine 304 and the history bar 602 in accordance with embodiments of the systems and methods disclosed herein. In a manner similar to the first user interface 400 and the second user interface 800, the third user interface 1200 displays the recently completed subroutine 302 in the history bar 602 so that the user can memorize the movements/activities and subroutines. However, the third user interface 1200 does not display animated representations of the next to be performed subroutine 304. This enables the user to recall the next subroutine at his or her own and start performing the movements/activities involved in the next subroutine.

The methods and systems described herein facilitate the memorization of the movements/activities and subroutines as well as the respective combinations, sequences and repetitions involved in the movements/activities and subroutines of the exercise routine through different types of user interfaces at different instances of the soundtrack. Instead of observing the trainers'/instructors' performance to learn, the systems and methods described herein facilitate splitting the trainer's/instructor's performance into movements/activities and subroutines; creating animated representations of the movements/activities and subroutines; and rendering user interfaces including audio-visual aids in a manner which facilitates the user to recall the movements/activities and subroutines through use of these audio-visual aids.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable the execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, 4G LTE, 5G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. All documents referenced herein are hereby incorporated by reference.

What is claimed is:

1. A system for automatically generating training routine content for training an individual to teach an exercise routine, comprising:
    one or more processors; and
    a non-transitory computer-readable storage medium having a plurality of instructions stored thereon, which, when executed by the one or more processors, cause the one or more processors to perform operations comprising:
    editing a video of an exercise routine;
    prompting the entry of markers for locations for insertion of motion graphics content;
    creating the motion graphics content that includes audio-visual elements configured to aid a user in memorization of the routine;
    generating at least a portion of a script for orchestrating the combination of the edited video from the video editing module and the audio-visual elements;
    adding automatically audio-visual elements to the edited video to produce a motion-graphics augmented training routine video, wherein the training routine video is automatically processed and comprises a series of segments each comprising a version of the exercise routine, wherein the segments are concatenated and are progressively edited to remove at least a subset of at least one of the edited video and the audio-visual elements, wherein the progressively edited segments in which at least the subset of at least one of the edited video and the audio-visual elements are removed to produce a shorter format that facilitates relatively easier memorization of the exercise routine.

2. The system of claim 1,
wherein the operations further comprise:
    receiving video content including the training routine of a trainer/instructor, wherein the video content includes at least one media file comprising at least one video.

3. The system of claim 2,
wherein the operations further comprise:
    generating at least one annotation within the at least one video.

4. The system of claim 3 wherein the operations further comprise:
    superimposing at least one animated image on the at least one video using the at least one annotation to create processed video content.

5. The system of claim 4:
wherein the operations further comprise: rendering the processed video content; and directing the processed video content to at least one user through a user interface that is configured to display the processed video content.

6. The system of claim 3 wherein the operations further comprise:
    rendering an interface to an operator to process at least one instruction corresponding to the at least one annotation, the motion graphics content and a combination thereof.

7. The system of claim 4, further comprising a user device configured to communicatively couple to a server through a network and configured to render the processed video content to a user through the user interface that is configured to display the processed video content.

8. The system of claim 5 wherein the operations further comprise:
    receiving instruction to customize the processed video content based on requirements of the user through the user interface.

* * * * *